R. GUILLERY.
VEHICLE SUSPENSION.
APPLICATION FILED NOV. 11, 1920.
1,422,567.
Patented July 11, 1922.
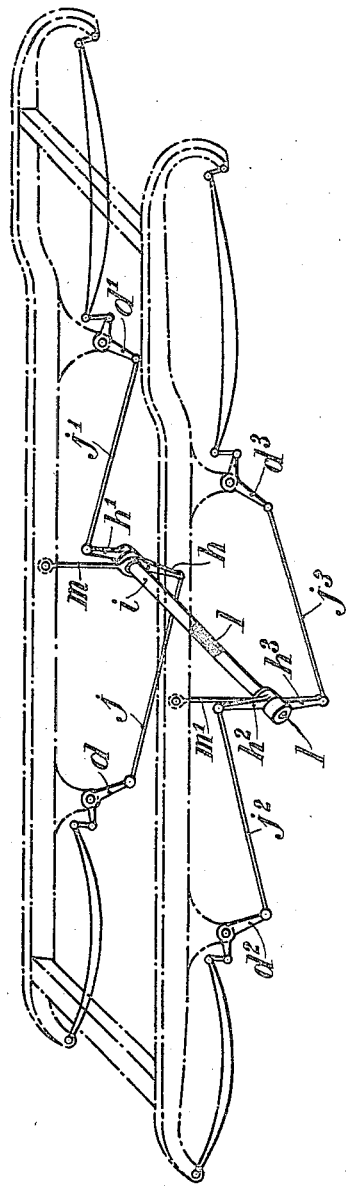
Inventor
R. Guillery
By H. R. Kerslake
Attorney

UNITED STATES PATENT OFFICE.

RENÉ GUILLERY, OF AUBERVILLIERS, FRANCE, ASSIGNOR TO SOCIÉTÉ DES ETABLISSEMENTS MALICET & BLIN, OF AUBERVILLIERS, SEINE, FRANCE.

VEHICLE SUSPENSION.

1,422,567.   Specification of Letters Patent.   Patented July 11, 1922.

Application filed November 11, 1920. Serial No. 423,393.

*To all whom it may concern:*

Be it known that I, RENÉ GUILLERY, a citizen of the Republic of France, and residing in Aubervilliers, Seine, France, have invented certain new and useful Improvements in Vehicle Suspensions, of which the following is a specification.

This invention has for its object improvements in vehicle suspension utilizing funicular compensation devices for accidental stresses; these improvements relate to a simplification of construction which consists in replacing the fast and loose grooved pulleys giving equality of tension on the cables extending from the four double levers of the primitive system by a double armed rocking lever suspended to the frame by means of hanging links with universal joint.

The new device is illustrated, by way of example, in the accompanying drawing.

The levers $h$ and $h^2$ rigidly secured on the tube $i$ are, in their normal position, at right angles to the cables $j$ and $j^2$ extending from the front double levers $d$ and $d^2$.

The levers $h^1$ and $h^3$ rigidly secured on the shaft $l$ passing within the tube $i$ are also, in their normal position, at right angles to the cables $j^1$ and $j^3$ extending from the rear double levers $d^1$ and $d^3$.

In case the frame can be considered as perfectly rigid, the shaft $l$ may even be rendered integral with the tube $i$, that is to say the four levers may be secured on one and the same axis, as, in this case, the relative displacements of the levers $h$ and $h^1$ and $h^3$ and $h^2$ are very small.

The tube $i$ is suspended to the frame by two rocking links $m$ and $m^1$ capable of pivoting at both ends in all directions.

It will be easily understood that, by means of this device, any tension exerted on one of the cables is integrally transmitted to each of the three other cables.

Having now described my invention, what I claim as new and desire to secure by Letters Patent is:

1. In a suspension for vehicles, a chassis, suspension springs on the chassis, a shaft mounted for swinging movement with respect to the chassis, levers arranged at the ends of said transverse shaft, and means connecting each of said levers to the corresponding suspension spring of the vehicle.

2. In a suspension for vehicles, a chassis, suspension springs on said chassis, a rotatable shaft mounted for swinging movement with respect to the chassis, opposed levers arranged at the ends of the shaft, and cables connecting the ends of the levers to corresponding suspension springs of the vehicle.

3. In a suspension for vehicles, a chassis, suspension springs on the chassis, a shaft arranged transversely with respect to the chassis between the suspension springs, opposed levers arranged on said transverse shaft, cables, levers pivoted to the body of the chassis and connected by the cables with the first mentioned levers, and means connecting the transverse shaft to the vehicle for movement relative thereto.

4. In a suspension for vehicles, a chassis, front and rear suspension springs on the chassis, a shaft arranged transversely with respect to the chassis between the front and rear suspension springs, levers arranged at the ends of the transverse shaft, bell crank levers connected to the chassis, cables connecting the first mentioned levers with the bell crank levers, means connecting the springs to adjacent bell crank levers, and means to support said shaft from the chassis.

5. In a suspension for vehicles, a chassis, front and rear suspension springs, a shaft arranged transversely with respect to the chassis between the front and rear suspension springs, levers arranged on the ends of the transverse shaft, bell crank levers pivoted to the chassis, cables connecting the first mentioned levers with the bell crank levers, means connecting the bell crank levers to the adjacent springs, a tube surrounding the transverse shaft, a rod carried by each end of the tube, and means to attach the tube to the chassis of the vehicle.

6. In a suspension for vehicles, a chassis, front and rear suspension springs, a shaft arranged transversely with respect to the chassis between the front and rear suspension springs, levers arranged on said shaft, bell crank levers pivoted to the chassis, cables connecting the first mentioned levers and the bell crank levers, means connecting the bell crank levers with the adjacent suspension springs, a supporting tube surrounding the transverse shaft, rods connected to the ends of said tube, and means pivotally attaching the rods to the chassis.

In testimony whereof I have signed my name to this specification.

RENÉ GUILLERY.